July 7, 1925.

E. W. GENT

TUNING FORK

Filed July 3, 1923

1,545,251

2 Sheets-Sheet 1

Inventor:
Edgar W. Gent
by E. W. Adams
Att'y.

July 7, 1925.
E. W. GENT
TUNING FORK
Filed July 3, 1923
1,545,251
2 Sheets-Sheet 2
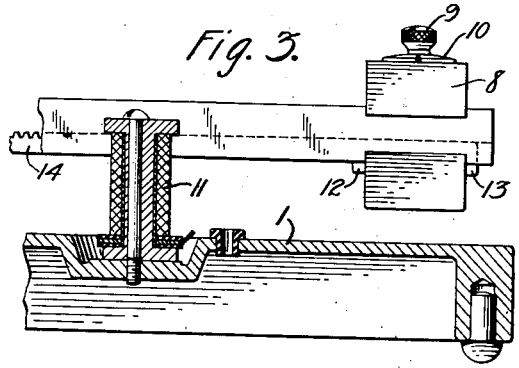
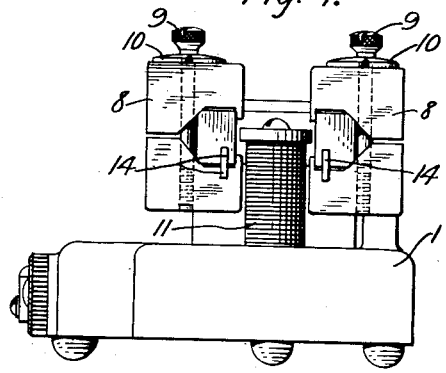
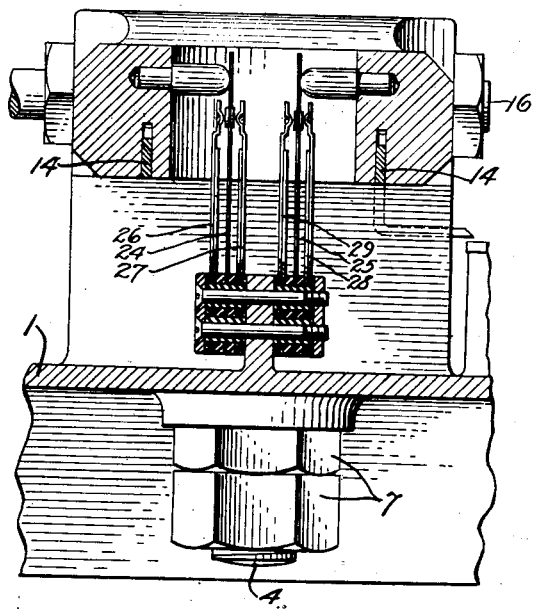
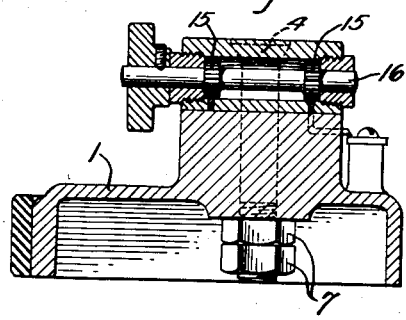
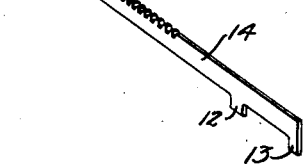
Inventor:
Edgar W. Gent
by E. W. Adam
Att'y.

Patented July 7, 1925.

1,545,251

UNITED STATES PATENT OFFICE.

EDGAR W. GENT, OF MORRISTOWN, NEW JERSEY, ASSIGNOR TO WESTERN ELECTRIC COMPANY, INCORPORATED, OF NEW YORK, N. Y., A CORPORATION OF NEW YORK.

TUNING FORK.

Application filed July 3, 1923. Serial No. 649,196.

*To all whom it may concern:*

Be it known that I, EDGAR WALTER GENT, a citizen of the United States of America, residing at Morristown, in the county of Morris and State of New Jersey, have invented certain new and useful Improvements in Tuning Forks, of which the following is a full, clear, concise, and exact description.

This invention relates to tuning forks and particularly to means for accurately altering the period of vibration of these devices while in operation.

One of the features of the invention resides in the provision of means for altering the frequency of tuning forks and similar apparatus by changing the effective length of the vibrating masses while the fork is in motion.

Another feature involves making this change without causing any change in the actual vibrating length of the tines. That is, the tines are allowed to vibrate freely and are not subject to the influence of any forces extraneous to them.

A further feature is the provision of means for indicating accurately at all times the frequency at which the fork is vibrating.

The change in effective length of the vibrating masses is accomplished by controlling the position of weights on the tines by manipulating a knurled handle and wheel, the latter being mounted on a shaft carrying pinions which engage toothed racks. These racks are caused to move longitudinally along the tines in slots cut into the under sides of the tines. In moving they carry with them the weights which are held by means of projections on the racks.

Since the racks fit snugly in the slots in the tines they follow the vibrations of the fork. The racks, tines and weights vibrate as a unit.

Figure 1:
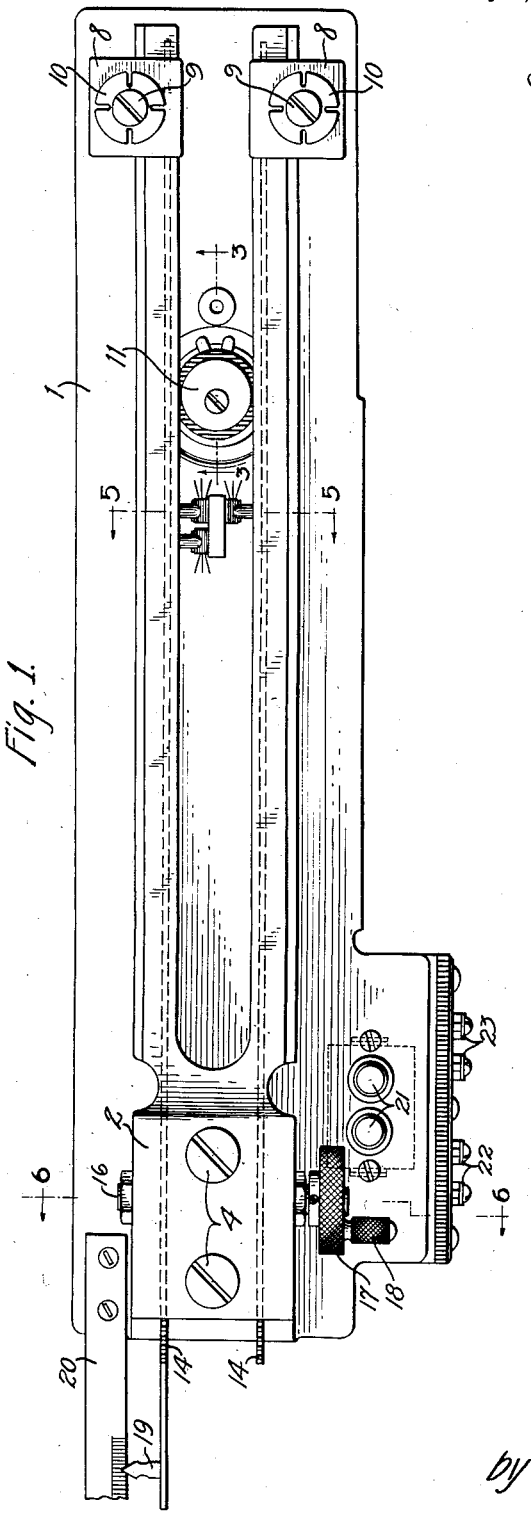
Figure 2:
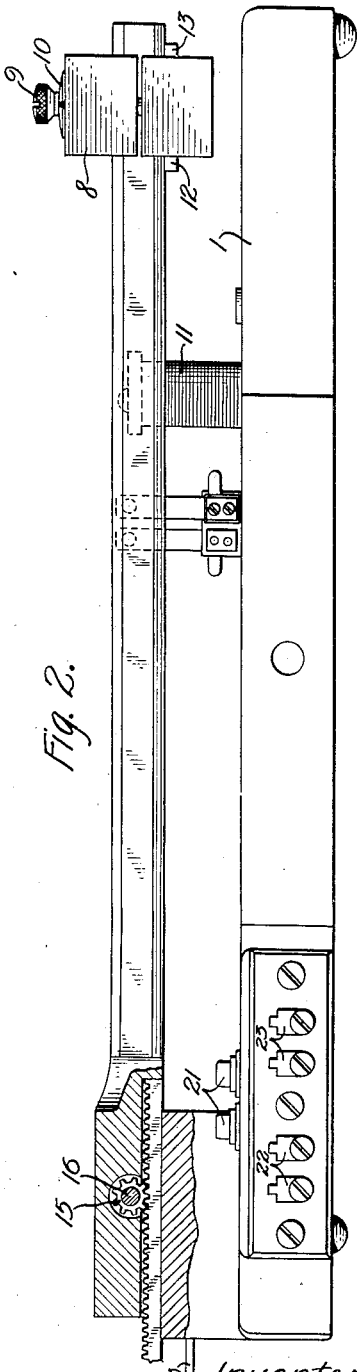

These and other features of the invention will be fully set forth in the following description and claims, and will be readily understood by reference to the accompanying drawings, wherein Fig. 1 is a plan view of the preferred embodiment; Fig. 2 is a side elevation, the rear end being cut away to show the rack and pinion; Fig. 3 is a section along the line 3—3 in Fig. 1 and shows the operating coil; Fig. 4 is an end view of the fork showing the method of mounting the weights on the tines; Fig. 5 is an enlargement of the section along the line 5—5 of Fig. 1 showing an arrangement for converting direct current to alternating current; Fig. 6 is a section along the line 6—6 of Fig. 1 and shows more clearly the method of controlling the movement of the racks; Fig. 7 is a view of the rack itself, showing means for gripping the weights and the teeth for engaging the pinions.

It will be readily understood that the tines of the fork described herein may be set in vibration by striking and may be maintained in vibration by means of an electromagnet in a well known manner.

The tuning fork and auxiliary parts are mounted on a base 1 which may be of any suitable material for forming a rigid support. This base is arranged with rubber studs on its under side permitting it to be moved about without subjecting the fork to undesired shocks. The shank 2 is firmly fastened to the base by means of suitable slotted head bolts 4, and associated nuts 7, the tines being allowed to project above and parallel to the base to permit free vibration. Slidably mounted on each tine is a weight consisting of two parts clamped together by a screw 9 having a slotted and knurled head to permit easy adjustment. Associated with this screw is a cup-shaped washer 10 which causes the weight to maintain a spring grip on the tine to prevent rattling of the weight and resulting inaccuracies while the fork is in vibration. The lower half of each weight is gripped between projections 12 and 13 of a rack 14. These racks are embedded in slots cut into the under side of the tines along their central line of vibration. These slots run the full length of the fork permitting the racks to extend upward from the shank of the fork. The racks are controlled by means of teeth cut along their upper edges which teeth are engaged by pinions 15. The latter are mounted on a common shaft 16 extending through the shank and terminating in a knurled wheel 17 having mounted thereon a knurled handle 18. The handle is used for making coarse adjustments of the weights and the wheel for finer adjustments. Suitably mounted on the end of one of the racks is a pointer 19 which is caused to pass over a scale 20, under control of the knurled handle and wheel. This scale may be calibrated to read in convenient units, preferably the number of vibrations of the fork and the frequency in cycles per second of the current output of the fork.

As has been stated above the fork is set in vibration by striking and thereafter maintained in vibration by means of an eccentrically mounted coil 11. The leads of the coil are brought out through the base to terminals 21 for conveniently connecting to its source of energizing current. Terminals 22 are provided for connecting to the source of direct current which is to be converted to alternating current. Leads from these terminals are suitably mounted in base 1 and connect respectively to the vibrating contacts 24 and 25. By making the proper cross connections with contacts 26, 27, 28 and 29, a reversing switch is obtained and an alternating current is formed in the well known manner. This current may be conducted by suitable leads to terminals 23 from which it may be distributed to serve its particular purpose.

It will readily be seen that if while the fork is in vibration it becomes desirable to change the frequency of the fork, this may easily be done by turning the handle 18 thereby rotating shaft 16, pinions 15 and racks 14, causing the weights 8 to slide forward or backward depending upon the direction of rotation of the handle 18. The desired frequency may be obtained by a reference to scale 20 and pointer 19. If a high degree of accuracy is desired wheel 17 may be manipulated after an approximate adjustment with handle 18.

What is claimed is:

1. In a tuning fork, tines, weights suitably mounted on said tines for longitudinal movement with respect to said tines and means to vary the position of said weights with respect to said tines while said fork is in vibration, said means bearing such a relation to said tines that said tines are free to vibrate throughout their entire length.

2. In a tuning fork, tines, weights suitably mounted on said tines for longitudinal movement with respect to said tines, means to vary the position of said weights with respect to said tines while said fork is in vibration, an indicating device, and means to operate said indicating device during said variation to indicate the frequency of vibration of said fork.

3. In a tuning fork, tines, weights slidably mounted on said tines, operating members for said weights, bearing surfaces for said operating members within said tines, and means to vary the position of said weights with respect to said tines by means of said operating members.

4. In a tuning fork, tines, weights slidably mounted on said tines, racks slidably mounted in said tines, said weights being secured to said racks, and a driving mechanism to simultaneously operate said racks to vary the position of said weights with respect to said tines.

5. In a tuning fork, tines, weights slidably mounted on said tines, racks slidably mounted in said tines, said weights being secured to said racks, a driving mechanism to operate said racks to vary the position of said weights with respect to said tines, an indicator carried by one of said racks, and means to operate said indicator during movement of said racks to indicate the frequency of said fork.

In witness whereof, I hereunto subscribe my name this 2nd day of July A. D., 1923.

EDGAR W. GENT.